United States Patent
Boutros et al.

(10) Patent No.: US 10,979,246 B2
(45) Date of Patent: Apr. 13, 2021

(54) MULTICAST PACKET HANDLING IN SOFTWARE-DEFINED NETWORKING (SDN) ENVIRONMENTS

(71) Applicant: Nicira, Inc., Palo Alto, CA (US)

(72) Inventors: Sami Boutros, Union City, CA (US); Alexander Tessmer, Palo Alto, CA (US); Subin Cyriac Mathew, Palo Alto, CA (US); Chidambareswaran Raman, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 67 days.

(21) Appl. No.: 16/043,164

(22) Filed: Jul. 24, 2018

(65) Prior Publication Data

US 2020/0036552 A1 Jan. 30, 2020

(51) Int. Cl.
| | |
|---|---|
| *H04L 12/46* | (2006.01) |
| *H04L 12/761* | (2013.01) |
| *H04L 12/715* | (2013.01) |
| *H04L 12/931* | (2013.01) |
| *G06F 9/455* | (2018.01) |

(52) U.S. Cl.
CPC ...... *H04L 12/4633* (2013.01); *G06F 9/45558* (2013.01); *H04L 12/4641* (2013.01); *H04L 45/16* (2013.01); *H04L 45/64* (2013.01); *H04L 49/70* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| | | |
|---|---|---|
| 7,478,173 B1 | 1/2009 | Delco |
| 8,619,771 B2 | 12/2013 | Lambeth et al. |
| 9,014,007 B2 | 4/2015 | Bhikkaji et al. |
| 9,306,837 B1 * | 4/2016 | Jain .................. H04L 45/16 |
| 9,350,657 B2 | 5/2016 | Gross, IV et al. |
| 9,432,204 B2 | 8/2016 | Shen et al. |
| 10,567,187 B2 | 2/2020 | Mathew et al. |
| 10,649,805 B1 | 5/2020 | Mishra et al. |
| 2003/0217183 A1 | 11/2003 | Rimmer et al. |
| 2003/0231629 A1 | 12/2003 | Banerjee et al. |
| 2006/0184695 A1 | 8/2006 | Monette et al. |

(Continued)

*Primary Examiner* — Lonnie V Sweet
(74) *Attorney, Agent, or Firm* — Su IP Consulting

(57) ABSTRACT

Example methods are provided for a host to perform multicast packet handling a software-defined networking (SDN) environment. One example method may comprise: in response to detecting, from a virtualized computing instance supported by the host, a request to join a first inner multicast group address, obtaining an outer multicast group address that is assigned to the first inner multicast group address and one or more second inner multicast group addresses; and generating and sending a request to join the outer multicast group address to one or more multicast-enabled network devices. In response to detecting an ingress encapsulated multicast packet that includes an outer header addressed to the outer multicast group address and an inner header addressed to the first inner multicast group address, the host may generate and send a decapsulated multicast packet to the virtualized computing instance that has joined the first inner multicast group address.

21 Claims, 8 Drawing Sheets

(56) References Cited

U.S. PATENT DOCUMENTS

| | | |
|---|---|---|
| 2007/0104192 A1 | 5/2007 | Yoon et al. |
| 2007/0183418 A1 | 8/2007 | Riddoch et al. |
| 2007/0217416 A1 | 9/2007 | Okuda |
| 2011/0085548 A1 | 4/2011 | Fernández Gutiérrez |
| 2012/0281697 A1 | 11/2012 | Huang |
| 2014/0192804 A1 | 7/2014 | Ghanwani et al. |
| 2014/0314079 A1* | 10/2014 | Jain ................. H04L 45/16 370/390 |
| 2015/0009992 A1 | 1/2015 | Zhang |
| 2015/0103679 A1* | 4/2015 | Tessmer ............. H04L 43/50 370/252 |
| 2015/0124586 A1 | 5/2015 | Pani |
| 2015/0127701 A1* | 5/2015 | Chu ................. H04L 45/22 709/201 |
| 2015/0236871 A1 | 8/2015 | Kang |
| 2016/0094353 A1 | 3/2016 | Sreeramoju et al. |
| 2016/0232019 A1 | 8/2016 | Shah et al. |
| 2016/0285641 A1 | 9/2016 | He et al. |
| 2017/0237650 A1 | 8/2017 | Beeram et al. |
| 2017/0250954 A1 | 8/2017 | Jain et al. |
| 2017/0302464 A1 | 10/2017 | Hu et al. |
| 2018/0006930 A1* | 1/2018 | Du ................. H04L 12/4641 |
| 2018/0167320 A1 | 6/2018 | Huang et al. |
| 2018/0234259 A1* | 8/2018 | Du ................. H04L 12/4633 |
| 2018/0270146 A1 | 9/2018 | Jiang et al. |
| 2019/0068555 A1 | 2/2019 | Tsirkin et al. |
| 2019/0081899 A1 | 3/2019 | Mundkur et al. |
| 2019/0273625 A1* | 9/2019 | Tessmer ............. H04L 12/18 |
| 2020/0036646 A1 | 1/2020 | Mathew et al. |

\* cited by examiner

MULTICAST PACKET HANDLING IN SOFTWARE-DEFINED NETWORKING (SDN) ENVIRONMENTS

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines (VMs) running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. In practice, multicasting refers to the transmission of information from a source to a group of destinations simultaneously. In an SDN environment, however, multicast packets are generally treated as unknown unicast packets or broadcast packets, which is inefficient and undesirable.

DETAILED DESCRIPTION

Figure 1:
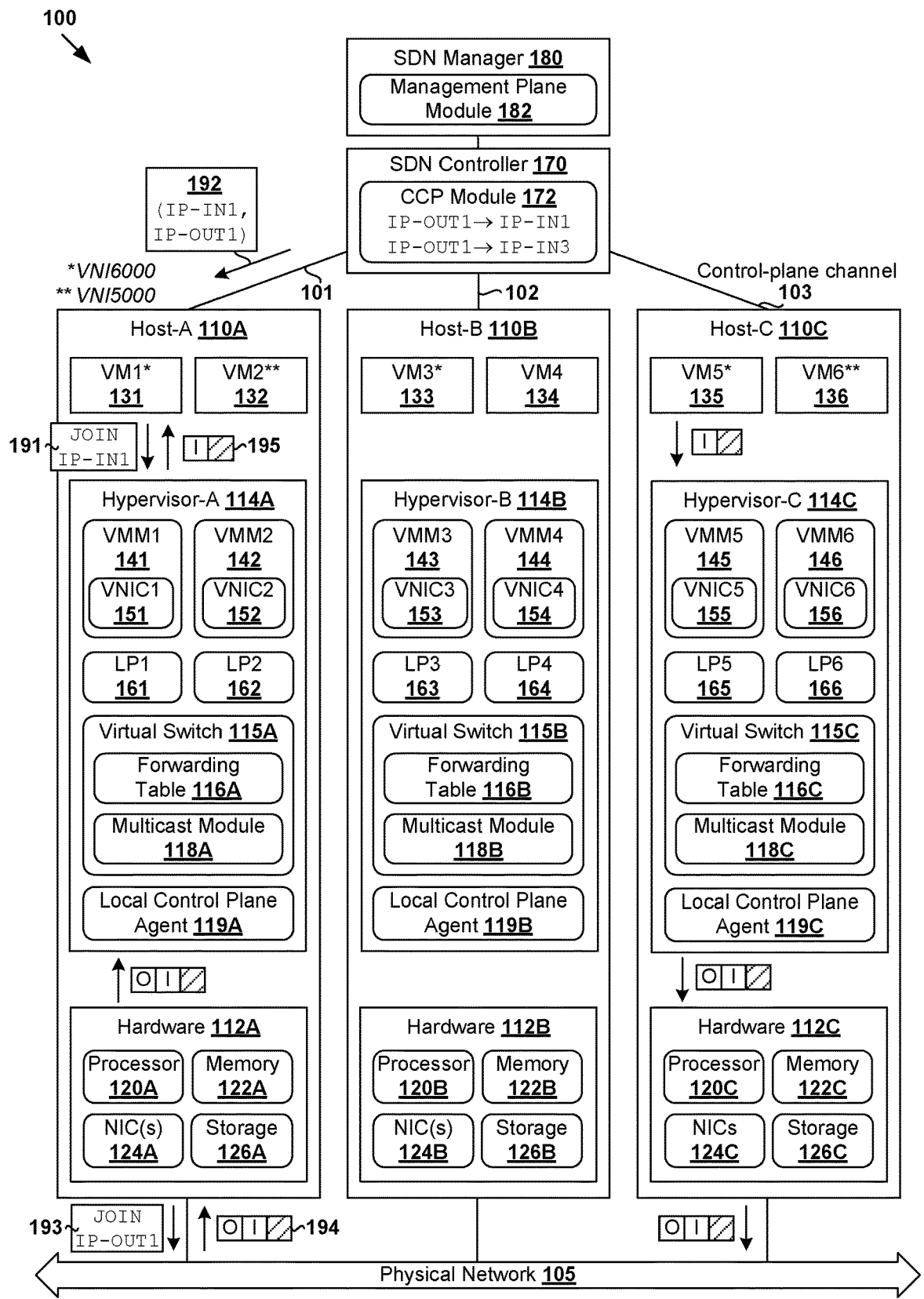
FIG. 1 is a schematic diagram illustrating an example Software-Defined Networking (SDN) environment in which multicast packet handling may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to multicast packet handling will now be explained in more detail using FIG. 1, which is a schematic diagram illustrating example Software-Defined Networking (SDN) environment 100 in which multicast packet handling may be performed. It should be understood that, depending on the desired implementation, SDN environment 100 may include additional and/or alternative components than that shown in FIG. 1.

In the example in FIG. 1, SDN environment 100 includes multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 and VM6 136. In practice, SDN environment 100 may include any number of hosts (also known as a "host computers", "host devices", "physical servers", "server systems", "transport nodes," etc.), where each host may be supporting tens or hundreds of VMs. Hypervisors 114A-C may each implement any suitable virtualization technology, such as VMware ESX® or ESXi™ (available from VMware, Inc.), Kernel-based Virtual Machine (KVM), etc.

Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 126A/126B/126C, etc. Virtual resources are allocated to each VM to support a guest operating system (OS) and applications (not shown for simplicity). Corresponding to hardware 112A/112B/112C, the virtual resources may include virtual CPU, guest physical memory, virtual disk, virtual network interface controller (VNIC), etc. Hardware resources may be emulated using virtual machine monitors (VMMs) 141-146, which may be considered as part of corresponding VMs 131-136, or alternatively, separated from VMs 131-136. In the example in FIG. 1, VNICs 151-156 are emulated by corresponding VMMs 141-146. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Hypervisor 114A/114B/114C further implements virtual switch 115A/115B/115C and a logical distributed router (DR) instance (not shown for simplicity) to handle egress packets from, and ingress packets to, corresponding VMs 131-136. In SDN environment 100, logical switches and logical distributed routers may be implemented in a distributed manner and can span multiple hosts to connect VMs 131-136. For example, logical switches that provide logical layer-2 connectivity may be implemented collectively by virtual switches 115A-C and represented internally using forwarding tables 116A-C at respective virtual switches 115A-C. Forwarding tables 116A-C may each include entries that collectively implement the respective logical switches. Further, logical distributed routers that provide logical layer-3 connectivity may be implemented collectively by DR instances and represented internally using routing tables (not shown for simplicity) at respective DR instances. Routing tables may each include entries that collectively implement the respective logical distributed routers.

Virtual switch 115A/115B/115C also maintains any suitable information to forward packets to and from corresponding VMs 131-136. Packets are received from, or sent to, each VM via an associated logical port. For example, logical ports 161-166 are associated with respective VMs 131-136. The term "packet" may refer generally to a group of bits that can be transported together, and may be in another form, such as "frame," "message," "segment," etc. The term "traffic" may refer generally to multiple packets. The term "layer-2" may refer generally to a link layer or Media Access Control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

As used herein, the term "logical port" may refer generally to a port on a logical switch to which a virtualized computing instance is connected. A "logical switch" may refer generally to an SDN construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Through SDN, benefits similar to server virtualization may be derived for networking services. For example, logical overlay networks may be provided that are decoupled from the underlying physical network infrastructure, and therefore may be provisioned, changed, stored, deleted and restored programmatically without having to reconfigure the underlying physical hardware. SDN controller 170 and SDN manager 180 are example network management entities that facilitate implementation of logical networks in SDN environment 100. One example of an SDN controller is the NSX controller component of VMware NSX® (available from VMware, Inc.) that may be a member of a controller cluster (not shown) and configurable using SDN manager 180. One example of an SDN manager is the NSX manager component that provides an interface for end users to perform any suitable configuration in SDN environment 100.

SDN controller 170 and SDN manager 180 support central control plane (CCP) module 172 and management plane module 182, respectively. To send and receive the control information (e.g., configuration information), each host 110A/110B/110C may implement local control plane (LCP) agent 119A/119B/119C to interact with SDN controller 170. For example, control-plane channel 101/102/103 may be established between SDN controller 170 and host 110A/110B/110C using TCP over Secure Sockets Layer (SSL), etc. Management entity 170/180 may be implemented using physical machine(s), virtual machine(s), a combination thereof, etc.

A logical overlay network (also known as "logical network") may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts. In the example in FIG. 1, VM1 131 on host-A 110A, VM3 133 on host-B 110B and VM5 135 on host-C 110C may be located on the same logical layer-2 segment, such as VXLAN segment with VXLAN network identifier (VNI)=6000. VM2 132 and VM6 136 may be located on a different segment, such as VNI=5000.

Each host 110A/110B/110C also maintains data-plane connectivity with other host(s) via physical network 105 to facilitate communication among VMs located on the same logical overlay network. Hypervisor 114A/114B/114C may implement a virtual tunnel endpoint (VTEP) to encapsulate and decapsulate packets with an outer header (also known as a tunnel header) identifying the relevant logical overlay network (e.g., VNI=100). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B) and hypervisor-C 114C implements a third VTEP with (IP-C, MAC-C, VTEP-C). Encapsulated packets may be sent via an end-to-end, bi-directional communication path (known as a tunnel) between a pair of VTEPs over physical network 105.

Conventionally, in SDN environment 100, multicast packets are treated as unknown unicast packets or broadcast packets. This means multicast packets that are addressed to a particular multicast group address will be sent it to all known VTEPs, regardless of whether they interested in the multicast packets. For example in FIG. 1, in response to detecting an egress multicast packet from VM5 135, VTEP-C implemented by hypervisor-C 114C (i.e., source VTEP) will send the multicast packet to both VTEP-A at hypervisor-A 114A and VTEP-B at hypervisor-B 114B (i.e., destination VTEPs). To reach VTEP-A at hypervisor-A 114A, a first encapsulated multicast packet is generated by encapsulating the multicast packet with an outer header identifying (source VTEP=VTEP-C, destination VTEP=VTEP-A). To reach VTEP-B at hypervisor-B 114B, a second encapsulated multicast packet is generated by encapsulating the multicast packet with an outer header identifying (source VTEP=VTEP-C, destination VTEP=VTEP-B).

The above conventional approach is undesirable because, in the example in FIG. 1, VM3 133 and VM4 134 on host-B 110B are not be interested in the multicast packet. In this case, resources will be wasted at source host-C 110C to generate and send the encapsulated multicast packet, as well as at destination host-B 110B to receive, process and eventually drop the encapsulated multicast packet. The replication at source host-C 110C may also easily saturate its uplink capacity, even in a medium-sized overlay domain. For example, if source host-C 110C has a 10 Gbps physical NIC, and it has to replicate to 100 receivers, a 100 Mbps multicast flow may saturate its uplink. These problems are exacerabated when there are multicast applications that continuously generate heavy multicast traffic, such as applications relating to video distribution, voice distribution, large file distribution, etc. Further, since there may be tens or hundreds of VTEPs in SDN environment 100, network performance will be adversely affected because physical network 105 will be flooded with unnecessary multicast traffic.

One example approach to improve multicast packet handling has been described in a related U.S. patent application Ser. No. 15/460,198 entitled "Multicast packet handling in a logical network," which is incorporated herein by reference. This approach may involve a source host leveraging the multicast capability of multicast-enabled network device(s) in physical network 105. In response to detecting an egress multicast packet having an inner header addressed to a multicast group address, the source host may generate an encapsulated multicast packet with an outer header that is addressed to the same multicast group address. The encapsulated multicast packet may then be sent to interested receivers in SDN environment 100.

In practice, some multicast-enabled network device(s) in physical network 105 may have limited snooping capability, in that they may only learn a limited number of multicast group addresses. For example, physical switches may support snooping of, say, 256 multicast group addresses due to application-specific intergrated circuit (ASIC) limitations, etc. Once a table that stores these multicast group addresses is full, the multicast-enabled network device(s) may cause flooding of multicast packets in SDN environment 100, which wastes network resources and is therefore undesirable. As such, some users may prefer a multicast packet handling approach that considers the limitation of the underlay hardware's capability.

Multicast Packet Handling

According to examples of the present disclosure, multicast packet handling in SDN environment 100 may be improved by leveraging the multicast capability of multicast-enabled network device(s) in physical network 105, as well as considering limitations in their snooping capability. For example in FIG. 1, instead of generating multiple encapsulated multicast packets that are addressed to different known destination VTEPs, the outer header is addressed to an outer multicast group address that is assigned to multiple inner multicast group addresses. This way, the likelihood of flooding of multicast packets by multicast-enabled network device(s) in physical network 105 may be reduced. The encapsulated multicast packet is forwarded to destination VTEPs that have joined the outer multicast group address in a multicast manner.

As used herein, the term a "multicast-enabled network device" may refer generally to a layer-2 switch, layer-3 router, etc., implementing any suitable multicast-enabling protocol. For example, multicast-enabled switches may support Internet Group Management Protocol (IGMP) for Internet Protocol version 4 (IPv4) systems, Multicast Listener Discovery (MLD) for IP version 6 (IPv6) systems, etc. Multicast-enabled routers may support Protocol Independent Multicast (PIM), Distance Vector Multicast Routing Protocol (DVMRP), Multicast Open Shortest Path First (MOSPF), etc. Such multicast-enabled network devices are capable of pruning multicast traffic from links or routes that do not have a multicast destination.

In practice, any suitable protocol may be used to report multicast group membership to multicast-enabled network device(s). For example, using IGMP version 1 (IGMPv1) or IGMP version 2 (IGMPv2), the join request may represent an IGMP host membership report. IGMP version 3 (IGMPv3) uses a different packet format, in which case an IGMP report packet may be used as a join request. For simplicity, the term "multicast group address" is used to represent a multicast group address used in IGMPv1 and IGMPv2, or a multicast routers group address used in IGMPv3. MLD (e.g., version 1 or version 2) may be used for IPv6 systems.

Figure 2:
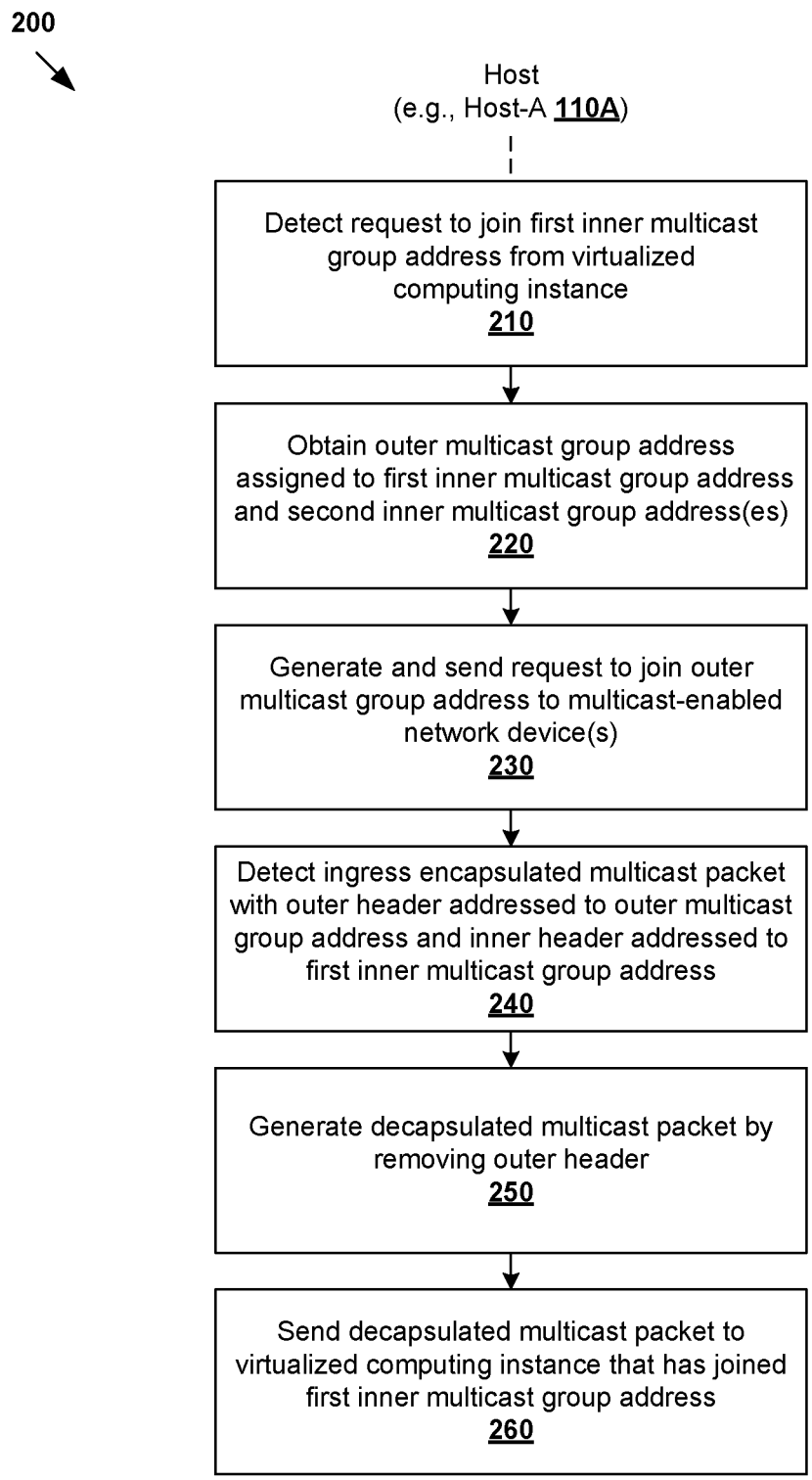
FIG. 2 is a flowchart of an example process for a host to perform multicast packet handling in an SDN environment.

In more detail, FIG. 2 is a flowchart of example process 200 for a host to perform multicast packet handling in an SDN environment. Example process 200 may include one or more operations, functions, or actions illustrated by one or more blocks, such as 210 to 260. The various blocks may be combined into fewer blocks, divided into additional blocks, and/or eliminated depending on the desired implementation. In practice, example process 200 may be implemented by any suitable hypervisor 114A/114B/114C supported by host 110A/110B/110C, such as using multicast module 118A/118B/118C at virtual switch 115A/115B/115C. In the following, an example will be explained using host-A 110A as an example "host," VM1 131 as example "virtualized computing instance" and SDN controller 170 as example "management entity."

At 210 and 220 in FIG. 2, in response to detecting a request to join a first inner multicast group address=IP-IN1 from VM1 131 (see 191 in FIG. 1), host-A 110A obtains an outer multicast group address=IP-OUT1 (see 192 in FIG. 2) assigned to IP-IN1. At 230 in FIG. 2, host-A 110A generates and sends a request to join the outer multicast group address (see 193 in FIG. 1) to multicast-enabled network device(s) that are capable of multicast forwarding based on the outer multicast group address.

In the example in FIG. 1, IP-OUT1 may be assigned to multiple inner multicast group addresses, including the first inner multicast group address=IP-IN1 and at least one second inner multicast group address (e.g., IP-IN3 in FIG. 1). As will be discussed further using FIG. 3 and FIG. 4, the outer multicast group address may be obtained by generating and sending a report to SDN controller 170 to cause the SDN controller 170 to assign the outer multicast group address based on an assignment policy. The report may include the first inner multicast group address=IP-IN1 and VTEP address information of host-A 110A.

At 240 and 250 in FIG. 2, in response to detecting an ingress encapsulated multicast packet (see 194 in FIG. 1) from multicast-enabled network device(s) in physical network 105, host-A 110A generates and sends a decapsulated multicast packet (see 195 in FIG. 1) to VM1 131 that has joined the first inner multicast group address=IP-IN1. In the example in FIG. 1, the ingress encapsulated multicast packet originates from host-C 110C, and includes an outer header (labelled "O") addressed to the outer multicast group address=IP-OUT1 and an inner header (labelled "I") addressed to the first inner multicast group address=IP-IN1. The decapsulated multicast packet may be generated by removing the outer header.

According to examples of the present disclosure, multicast packet handling may be performed in a more scalable manner in SDN environment 100 by assigning one outer multicast group address to multiple (N) inner multicast group addresses. This way, multicast-enabled network device(s) in physical network 105 may learn M number of outer multicast group addresses to support overlay multicast traffic of M×N inner multicast group addresses, thereby improving scability and reducing the likelihood of multicast packet flooding. In practice, the "outer multicast group address" may be referred to as an "underlay multicast group address" to represent multicasting within underlay physical network 105. The "inner multicast group address" may be referred to as an "overlay multicast group address" to represent multicasting within logical overlay networks. In the following, various examples will be described using FIG. 3 to FIG. 8.

Detailed Process

Figure 3:
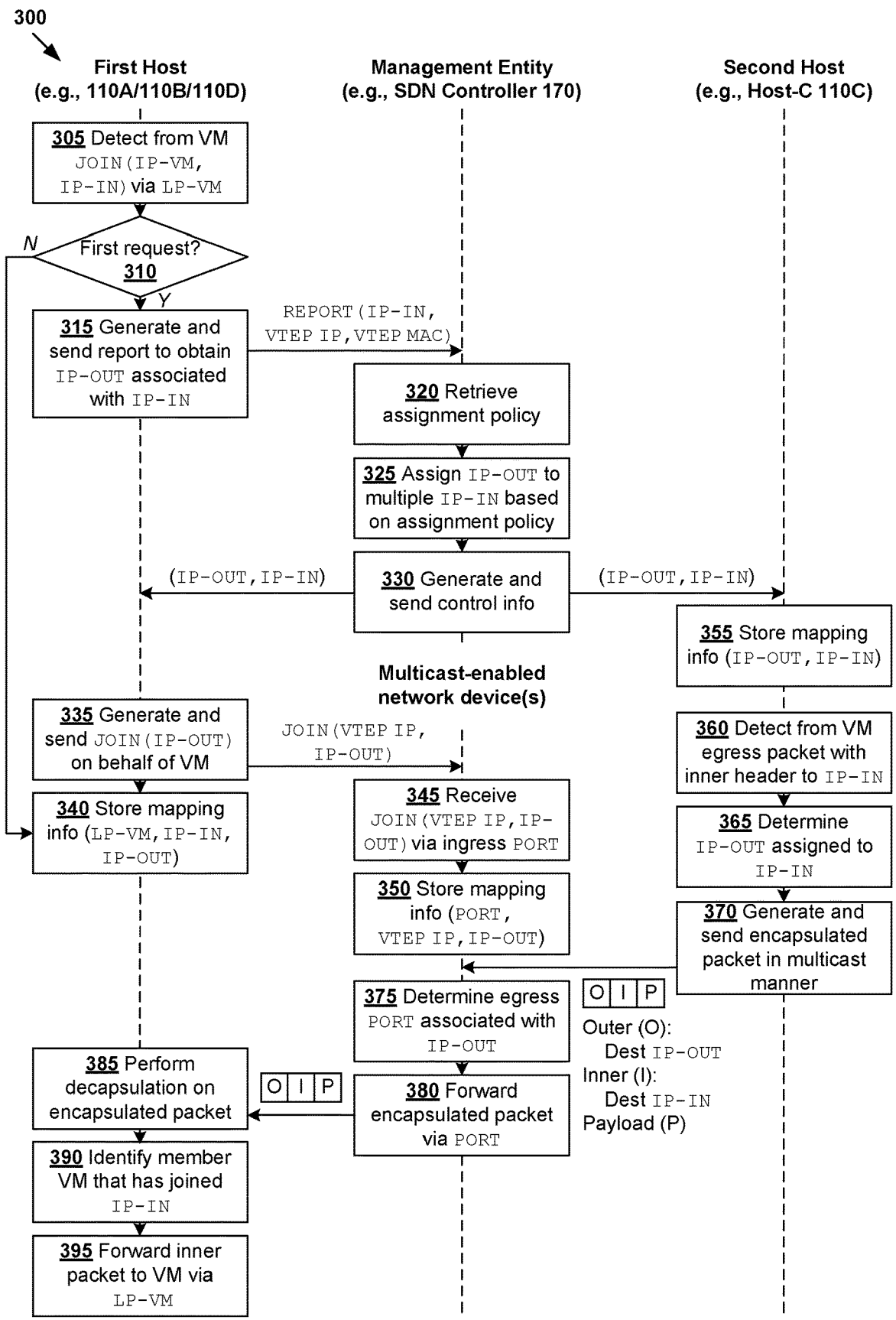
FIG. 3 is a flowchart of an example detailed process for multicast packet handling in an SDN environment.

FIG. 3 is a flowchart of example detailed process 300 for multicast packet handling in SDN environment 100. Example process 300 may include one or more operations, functions, or actions illustrated by one or more blocks, such as 305 to 395. The various blocks may be combined into fewer blocks, divided into additional blocks, and/or eliminated depending on the desired implementation. In the following, example process 300 will be explained using host 110A/110B/110D as an example "first host," host-C 110C as an example "second host," and SDN controller 170 as an example "management entity." In practice, examples of the present disclosure may be implemented by hosts 110A-D using respective multicast modules 118A-D, etc.

Figure 4:
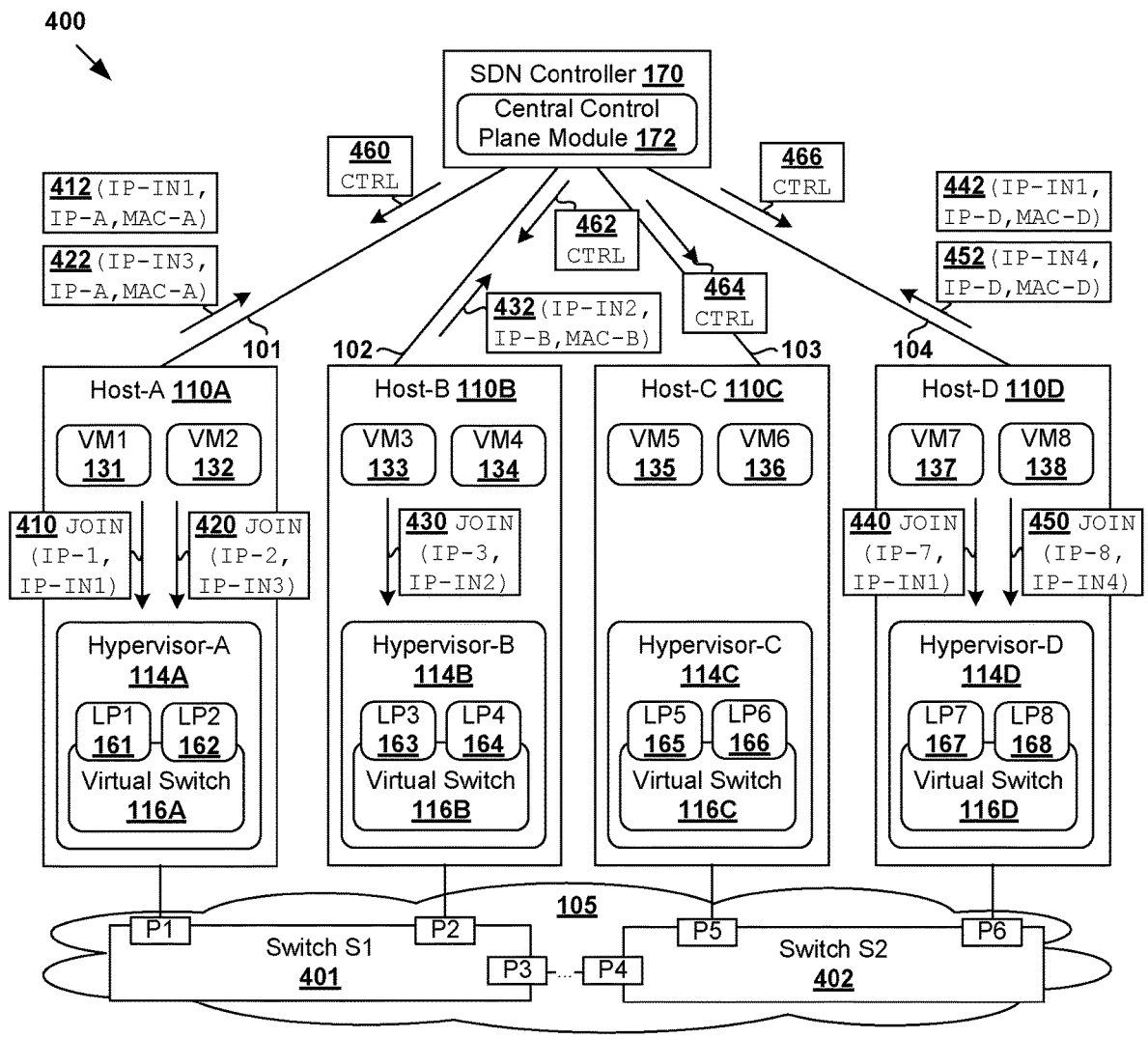
FIG. 4 is a schematic diagram illustrating an example of hosts handling requests to join an inner multicast group address in an SDN environment according to the example in FIG. 3.
Figure 5:
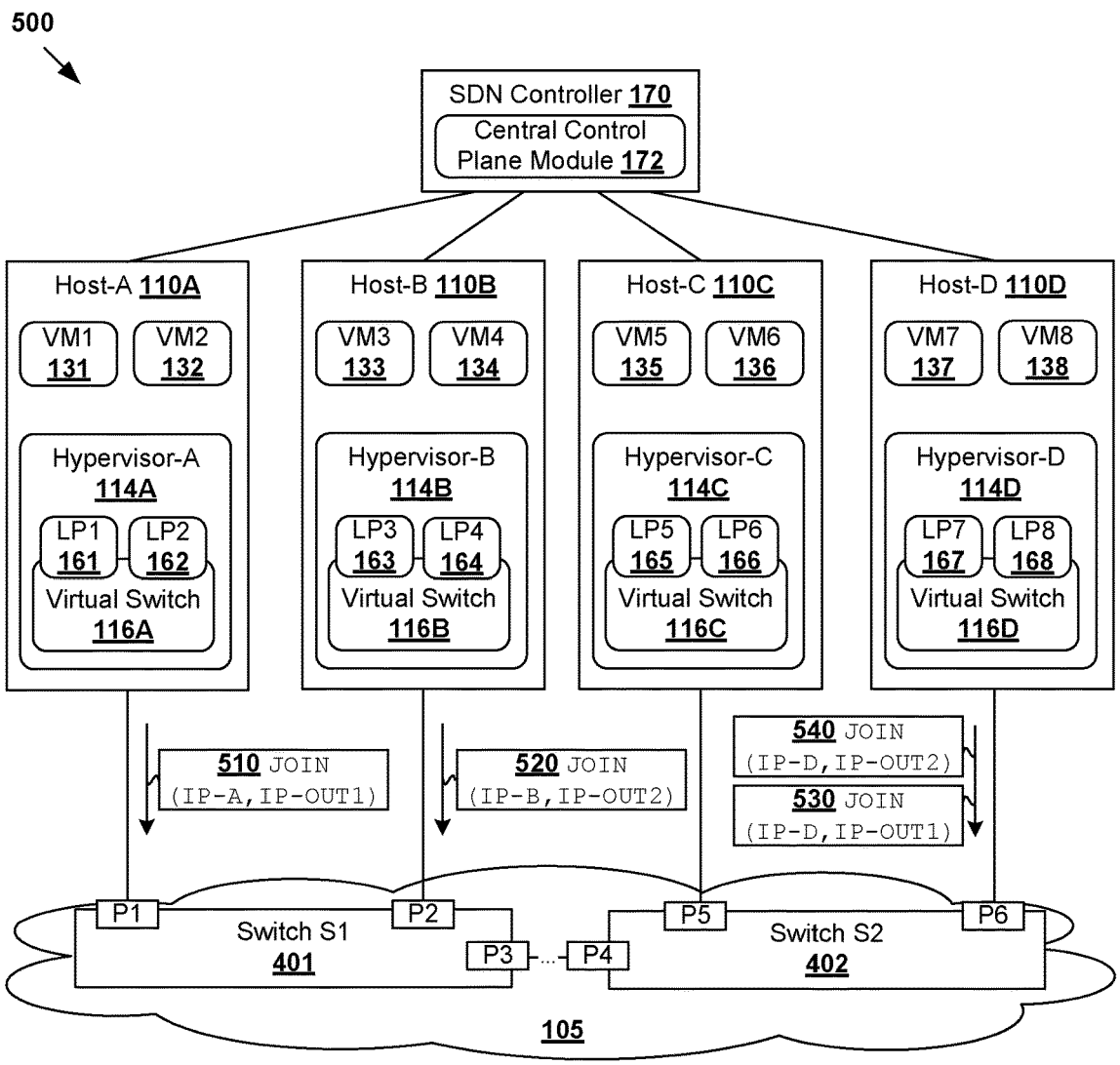
FIG. 5 is a schematic diagram illustrating an example of hosts joining outer multicast group addresses in an SDN environment according to the example in FIG. 3.

The example in FIG. 3 will be explained using FIG. 4 and FIG. 5. In particular, FIG. 4 is a schematic diagram illustrating example 400 of hosts handling requests to join an inner multicast group address in SDN environment 100 according to the example in FIG. 3. FIG. 5 is a schematic diagram illustrating example 500 of hosts joining outer multicast group addresses in SDN environment 100 according to the example in FIG. 3. Compared to the example in FIG. 1, SDN environment 100 may further include host-D 110D that is connected with SDN controller 170 via control-plane channel 104, and hosts 110A-C via physical network 105. Host-D 110D supports multiple VMs, such as VM7 137 and VM8 138. Host-D 110D may include components similar to that of hosts 110A-C, the description of which has been discussed using FIG. 1 and not repeated here for brevity.

(a) Joining Inner Multicast Group Address

At 305 in FIG. 3, a host (e.g., host-A 110A) performs snooping to detect a request to join an inner multicast group address from a VM. Here, multicast snooping may refer generally to a technique to monitor multicast activity associated with corresponding VMs. At 310 and 315, in response to determination the request is a first request (i.e., no previous request to join the same inner multicast group address has been detected), the host generates and sends a report to SDN controller 170. In practice, the inner multicast group address represents a logical identifier for a group of members (e.g., VMs, etc.). For example, using IPv4 addressing, the inner multicast group address may be within the range of 224.0.0.0 to 239.255.255.255.

In a first example in FIG. 4, in response to detecting first join request 410 from VM1 131, multicast module 118A at host-A 110A sends first report 412 to SDN controller 170 via control-plane channel 101. First join request 410 specifies (source address=IP-1, inner multicast group address=IP-IN1), where IP-1 is an IP address associated with VM1 131 and IP-IN1=229.0.0.1. First report 412 specifies (inner multicast group address=IP-IN1, VTEP IP-A, VTEP MAC-A), where IP-A and MAC-A are respective IP address and MAC address of VTEP-A implemented by host-A 110A.

In a second example in FIG. 4, in response to detecting second join request 420 from VM2 132, multicast module 118A at host-A 110A sends second report 422 to SDN controller 170 via control-plane channel 101. Second join request 420 specifies (source address=IP-2, inner multicast group address=IP-IN3), where IP-2 is an IP address associated with VM2 132 and IP-IN3=229.0.0.3. Second report 422 specifies (IP-IN3, VTEP IP-A, VTEP MAC-A), where IP-A and MAC-A are respective IP address and MAC address of VTEP-A. Depending on the desired implementation, first report 412 and second report 422 may be combined to be a single report to reduce traffic on the control plane.

In a third example in FIG. 4, in response to detecting third join request 430 from VM3 133, multicast module 118B at host-B 110B sends third report 432 to SDN controller 170 via control-plane channel 102. Third join request 430 specifies (source address=IP-3, inner multicast group address=IP-IN2), where IP-3 is an IP address associated with VM3 133 and IP-IN2=229.0.0.2. Third report 432 specifies (IP-IN2, VTEP IP-B, VTEP MAC-B), where IP-B and MAC-B are respective IP address and MAC address of VTEP-B implemented by host-B 110B.

In a fourth example in FIG. 4, in response to detecting fourth join request 440 from VM7 137, multicast module 118D at host-D 110D sends fourth report 442 to SDN controller 170 via control-plane channel 104. Fourth join request 440 specifies (source address=IP-7, inner multicast group address=IP-IN1), where IP-7 is an IP address associated with VM7 137 and IP-IN1=229.0.0.1. Fourth report 440 specifies (IP-IN1, VTEP IP-D, VTEP MAC-D), where IP-D and MAC-D are respective IP address and MAC address of VTEP-D implemented by host-D 110D.

In a fifth example in FIG. 4, in response to detecting fifth join request 450 from VM8 138, multicast module 118D at host-D 110D sends fifth report 452 to SDN controller 170 via control-plane channel 104. Fifth join request 450 specifies (source address=IP-8, inner multicast group address=IP-IN4), where IP-8 is an IP address associated with VM8 138 and IP-IN4=229.0.0.4. Fifth report 450 specifies (IP-IN4, VTEP IP-D, VTEP MAC-D), where IP-D and MAC-D are respective IP address and MAC address of VTEP-D implemented by host-D 110D.

(b) Obtaining Outer Multicast Group Address

Referring to FIG. 3 again, at 320 and 325, in response to receiving reports 412-452, SDN controller 170 retrieves an assignment policy and assigns an outer multicast group address to an inner multicast group address specified in the report. The outer multicast group address may be selected from a pool of IP addresses with any suitable size. In the example in FIG. 4, a pre-configured address pool with size M=2 is shown, where IP-OUT1=238.0.0.1 and IP-OUT2=238.0.0.2.

Depending on the desired implementation, the size (M) of the address pool may be configured based on a number of factors. For example, address pool may have a range of addresses that does not conflict with other non-overlay multicast applications in SDN environment 100. Another factor may be the IGMP snooping capability of the underlay network, such as the number of multicast group addresses that may be learned by multicast-enabled network device(s) in physical network 105. In this case, the size of the address pool may be limited by the underlay hardware's capability.

In practice, any suitable assignment policy may be used. For example, using a round robin policy, SDN controller 170 assigns IP-OUT1 to IP-IN1 specified in first report 412 from host-A 110A and fourth report 442 from host-D 110D. IP-OUT2 is assigned to IP-IN2 specified in third report 432 from host-B 110B. Next, IP-OUT1 is also assigned to IP-IN3 specified in second report 422 from host-A 110A. Further, IP-OUT 2 is assigned to to IP-IN4 specified in fifth report 452 from host-D 110D. As such, IP-OUT1 is assigned to inner multicast group addresses IP-IN1 and IP-IN3, and IP-OUT 2 to both IP-IN2 and IP-IN4. In practice, IP addresses IP-OUT1 and IP-OUT2 may be associated with respective MAC addresses MAC-OUT1 and MAC-OUT2.

Although an example is shown in FIG. 4, it should be understood that any alternative and/or additional assignment policy may be used. In another example, a load-based assignment policy may be used. In this case, if the multicast traffic for inner multicast group address IP-IN2 is detected to be very heavy (e.g., exceeds a predetermined threshold), SDN controller 170 may assign IP-OUT1 to IP-IN4 instead of IP-OUT2 as shown in FIG. 4. Using this approach, IP-OUT1 is assigned to (IP-IN1, IP-IN 3, IP-IN4), while IP-OUT2 is assigned to IP-IN2. This ensures that hosts supporting member(s) of IP-IN2 do not receive multicast traffic addressed to IP-IN4. In practice, load or traffic information may be obtained using any suitable monitoring tool, such as NetFlow Logic (a trademark of NetFlow Logic Corporation), etc.

In practice, one outer multicast group address may be mapped to or associated with N inner multicast group addresses. When N is large, less replication is required but more receivers might receive unwanted multicast traffic (i.e., traffic to inner multicast group address that has not been joined). When N is very small, more replication is required but most receivers will only receive wanted multicast traffic. Examples of the present disclosure may be used with any suitable optimization strategy for multicast routing, such as approaches discussed in a related U.S. patent application Ser. No. 15/868,871 that is filed on Jan. 11, 2018 and entitled "Methods to Optimize Multicast Routing in Overlay Networks," which is incorporated herein by reference. This way, multicast routing may be improved by reducing bandwidth usage in physical network 105 and unnecessary processing at hosts 110A-D.

At 330 in FIG. 3, SDN controller 170 generates and sends control information to host 110A/110B/110C/110D. At 335, in response to receiving the control information, host 110A/110B/110D generates and sends a join request to join an outer multicast group address to multicast-enabled network device(s) in physical network 105. Further, at 340 and 355, host 110A/110B/110C/110D stores the relevant multicast mapping information, such as in the form of (logical port, VM's address, inner multicast group address, outer multicast group address). This is to keep track of the mapping between an inner multicast group address and an outer multicast group address, as well as member(s) of the inner multicast group address.

In the example in FIG. 4, host-A 110A stores multicast mapping information (LP1, IP-1, IP-IN1, IP-OUT1) and (LP2, IP-2, IP-IN2, IP-OUT1), where "LP1" identifies LP1 161 via which request 410 to join IP-IN1 is received from VM1 131 and "LP2" identifies LP2 162 via which request 420 to join IP-IN2 is received from VM2 132. See corresponding 471-472. Host-B 110B stores (LP3, IP-3, IP-IN2, IP-OUT2), where "LP3" identifies LP3 163 via which request 430 to join IP-IN2 is received from VM3 133. See corresponding 473.

Similarly, host-D 110D stores (LP7, IP-7, IP-IN1, IP-OUT1) and (LP8, IP-8, IP-IN4, IP-OUT2), where "LP7" identifies LP7 167 via which request 440 to join IP-IN1 is received from VM7 137 and "LP8" identifies LP8 168 via which request 450 to join IP-IN4 is received from VM8 138. See corresponding 474-475. SDN controller 170 and hosts 110A-D also keep track of the association between an inner multicast group address and an outer multicast group address, including (IP-OUT1, IP-IN1), (IP-OUT1, IP-IN3), (IP-OUT2, IP-IN2), (IP-OUT4, IP-IN4). See corresponding 476-477. Although not shown in FIG. 4 for simplicity, multicast mapping information 471-477 may include multicast group MAC addresses, such as MAC-OUT1 associated with IP-OUT1, and MAC-OUT2 with IP-OUT2.

(c) Joining Outer Multicast Group Address

Referring also to FIG. 5, in response to receiving first control information 460, host-A 110A generates and sends first join request 510 specifying (VTEP IP-A, IP-OUT1) to join IP-OUT1 on behalf of VM1 131 and VM2 132. In response to receiving second control information 462, host-B 110B generates and sends second join request 520 specifying (VTEP IP-B, IP-OUT2) to to join IP-OUT2 on behalf of VM3 133. In response to receiving third control information 464, host-D 110D generates and sends third join request 530 specifying (VTEP IP-D, IP-OUT1) to join IP-OUT1 on behalf VM7 137, and fourth join request 540 specifying (VTEP IP-D, IP-OUT2) to join IP-OUT2 on behalf of VM8 138.

It should be understood that, once host 110A/110B/110D has joined a particular outer multicast group address, any subsequent VM's request to join an inner multicast group address that is associated with the same outer multicast group address may be suppressed. For example, referring to host-B 110B again, a subsequent join request identifying (source address=IP-4, inner multicast group address=IP-IN4) may be received from VM4 134 via LP4 164. In this case, since IP-IN4 is associated with IP-OUT2 and host-B 110B has already joined IP-OUT2 on behalf of VM2 132, the join request from VM4 134 is suppressed. In this case, according to 310 and 340 in FIG. 3, host-B 110B proceeds to learn multicast mapping information (port ID=LP4, source address=IP-4, IP-IN4, IP-OUT2).

Since a hypervisor may support tens or hundreds of VM, the join request suppression reduces the number of multicast report packets sent to physical network 105. This in turn reduces the processing burden on multicast-enabled network device(s) on physical network 105 to perform snooping and learn the associated multicast mapping information. In practice, a multicast querier (i.e., device that sends queries) may also be elected to periodically broadcast a membership query packet at predetermined time intervals to trigger the join packets.

(d) Multicast-Enabled Network Device(s)

At 345 and 350 in FIG. 3, in response to receiving a join packet via an ingress port, multicast-enabled network device(s) in physical network 105 perform IGMP snooping to store multicast mapping information that associates the ingress port with the (outer) multicast group address. This way, each multicast-enabled network device does not send a multicast packet out to all ports, but only to ports from which a join request has been received. Physical network 105 may include any suitable number of multicast-enabled network device(s) connecting hosts 110A-110C. In practice, not all network device(s) forming physical network 105 have to be multicast-enabled.

In the example in FIG. 4 and FIG. 5, physical network 105 includes multicast-enabled layer-2 switches labelled "S1"

401 and "S2" 402. Host-A 110A and host-B 110B are connected to S1 401 via respective ports labelled "P1" and "P2," while host-C 110C and host-D 110D are connected to S2 402 via respective ports labelled "P5" and "P6." S1 401 and S2 402 are connected with each other via respective ports labelled "P3" at S1 401 and "P4" at S2 402. It should be understood that S1 401 and S2 402 may be connected to each other directly, or indirectly via other intermediate network device(s) that are not shown for simplicity.

Referring first to S1 401, in response to receiving first join request 510 via port P1 connected with host-A 110A, S1 401 performs IGMP snooping to learn multicast mapping information (port ID=P1, source address=IP-A, multicast group address=IP-OUT1); see 561 in FIG. 5. At S2 402, join request 510 is received via port P4, in which case multicast mapping information (P4, IP-A, IP-OUT1) is stored; see 571 in FIG. 5. In response to receiving second join request 520 via port P2 connected with host-B 110B, S1 401 performs IGMP snooping to learn multicast mapping information (P2, IP-B, IP-OUT2); see 562 in FIG. 5. At S2 402, second join request 520 is received via port P4, in which case (P4, IP-B, IP-OUT2) is stored by S2 402; see 572 in FIG. 5.

In response to receiving third join request 530 via port P6 connected with host-D 110D, S2 402 learns multicast mapping information (P6, IP-D, IP-OUT1); see 573 in FIG. 5. At S1 401, third join request 530 is received via port P3, in which case (P3, IP-D, IP-OUT1) is stored; see 563 in FIG. 5. Similarly, in response to receiving fourth join request 540 via port P6, S2 402 learns multicast mapping information (P6, IP-D, IP-OUT2); see 574 in FIG. 5. At S1 401, fourth join request 540 is received via port P3, in which case (P3, IP-D, IP-OUT2) is stored; see 564 in FIG. 5. In practice, the multicast mapping information is usually associated with an expiry time, which is refreshed when a join packet is received via a receiving port. Depending on the desired implementation, switches 401-402 may store multicast mapping information in the form of (port ID, multicast group address). In this case, it is not necessary to store the source address (e.g., IP-A) from which a join request is detected. Any alternative and/or additional multicast mapping information may be stored.

Multicast Packet Handling

Figure 6:
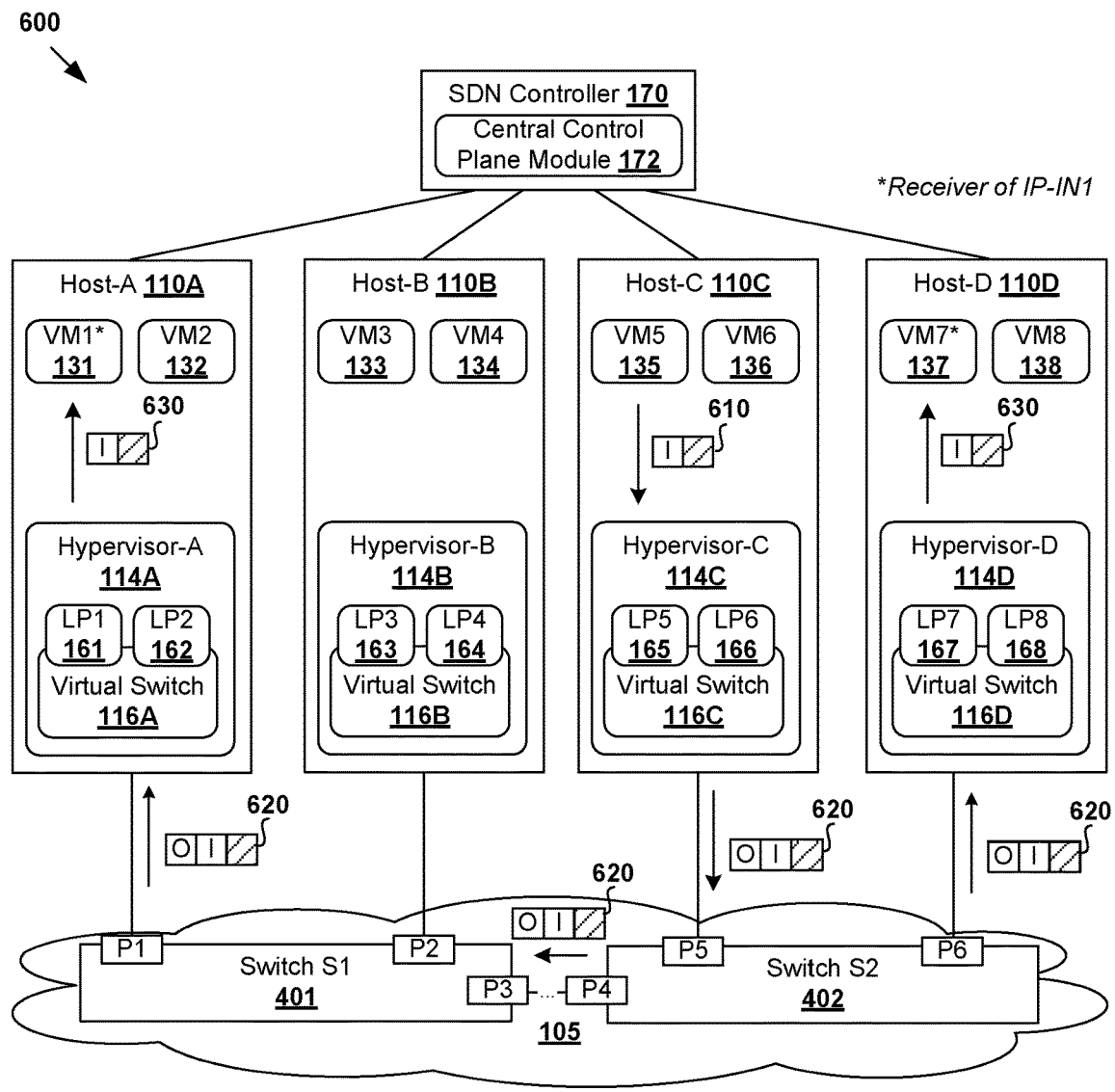
FIG. 6 is a schematic diagram illustrating a first example of multicast packet handling in an SDN environment according to the example in FIG. 3.
Figure 7:
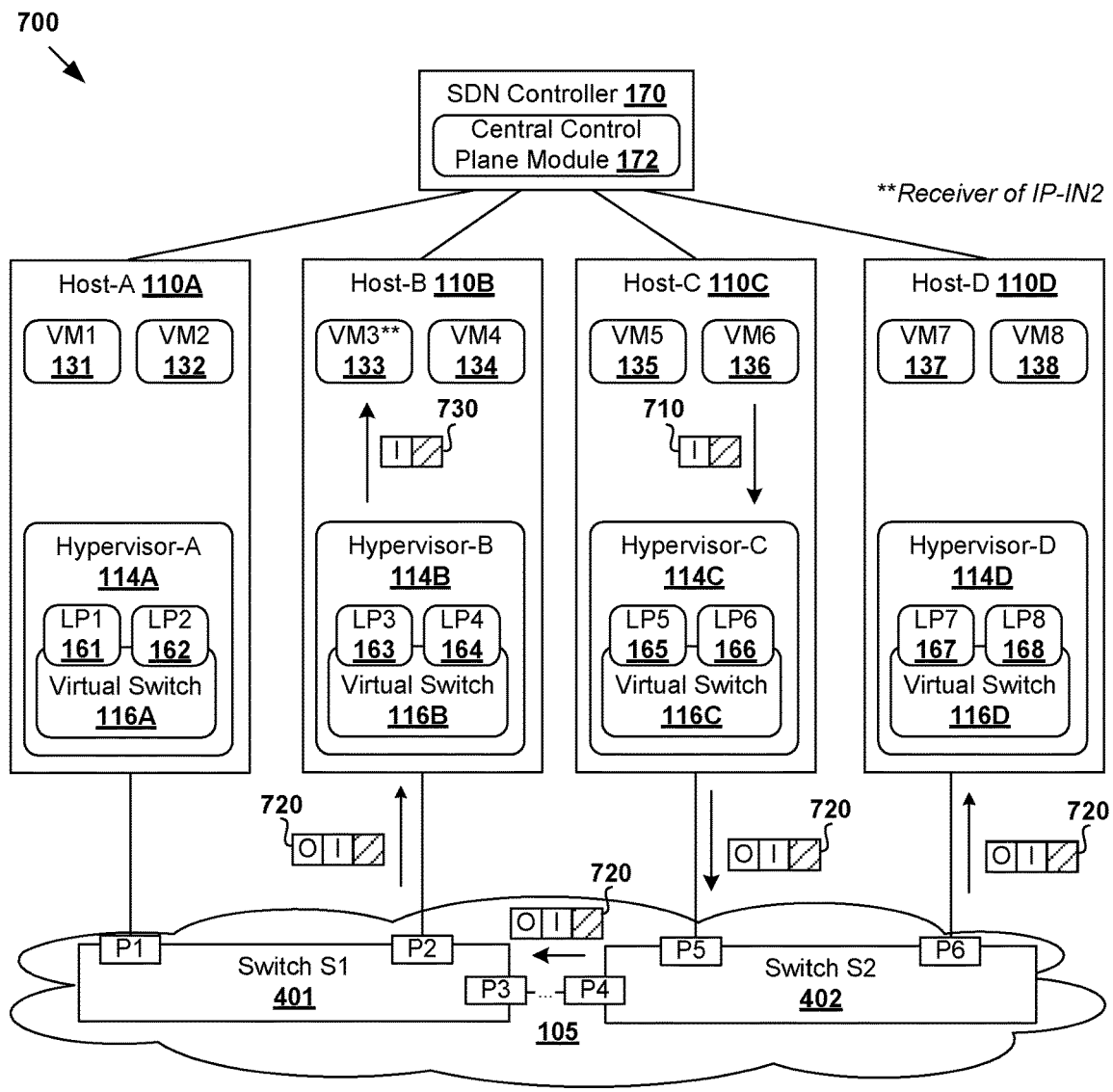
FIG. 7 is a schematic diagram illustrating a second example of multicast packet handling in an SDN environment according to the example in FIG. 3.

Example multicast packet handling will be explained using blocks 360-395 in FIG. 3, FIG. 6 and FIG. 7. In particular, FIG. 6 is a schematic diagram illustrating first example 600 of multicast packet handling in SDN environment 100 according to the example in FIG. 3. FIG. 7 is a schematic diagram illustrating second example 700 of multicast packet handling in SDN environment 100 according to the example in FIG. 3.

(a) Multicast Packets from VM5 135 to IP-IN1

In a first example in FIG. 6, consider the case where VM5 135 on host-C 110C sends egress multicast packet 610 to inner multicast group address=IP-IN1, of which VM1 131 on host-A 110A and VM7 137 on host-D 110D are members. As shown in FIG. 6, egress multicast packet 610 includes inner header 612 (labelled "I") and payload 614. Inner header 612 is addressed from source IP address=IP-5 associated with VM5 135 to inner multicast group address=IP-IN1. According to blocks 360 and 365 in FIG. 3, in response to detecting egress multicast packet 610 from VM5 135 via logical port LP5 165, host-C 110C determines IP-OUT1 associated with IP-IN1 based on multicast mapping information (IP-OUT1, IP-IN1) shown at 476 in FIG. 4.

Instead of sending the egress muticast packet to all known destination VTEPs according to the conventional approach, host-C 110C leverages the multicast-enabled network device(s) in physical network 105. At 370 in FIG. 3, host-C 110C generates encapsulated multicast packet 620 that includes outer header 622 (labelled "O") specifying (source VTEP IP address=IP-C, destination outer multicast group address=IP-OUT1, source VNI=6000). Encapsulated multicast packet 620 is then sent to physical network 105 in a multicast manner. Note that the source VNI is maintained in encapsulated multicast packet 620 for destination host-A 110A and host-D 110D to replicate to their local logical overlay network with VNI=6000 for layer-2 multicast and other local logical overlay network(s) for layer-3 multicast.

At switch S2 402, encapsulated multicast packet 620 is received via port P5 connected with host-C 110C. Based on multicast mapping information (P4, IP-A, IP-OUT1) and (P6, IP-D, IP-OUT1) shown at 571, 573 in FIG. 5, switch S2 402 determines that destination IP address=IP-OUT1 is associated with ports P4 and P6. As such, switch S2 402 forwards encapsulated multicast packet 620 via ports P4 connected with switch S1 401 and P6 connected with host-D 110D. See blocks 375-380 in FIG. 3.

At switch S1 401, encapsulated multicast packet 620 is received via port P3. Based on multicast mapping information (P1, IP-A, IP-OUT1) and (P3, IP-D, IP-OUT1) at respective 561, 563 in FIG. 5, S1 401 determines that destination IP address=IP-OUT1 is associated with ports P1 and P3. Since encapsulated multicast packet 620 is received via P3, switch S1 401 forwards encapsulated multicast packet 620 to P1 connected with host-A 110A (i.e., omitting receiving port=P3 via which encapsulated multicast packet 620 is received). See blocks 375-380 in FIG. 3.

At host-A 110A, in response to receiving encapsulated multicast packet 620, host-A 110A examines encapsulated multicast packet 620 and performs decapsulation to generate decapsulated multicast packet 630 by removing outer header 622. Based on multicast mapping information (LP1, IP-1, IP-IN1, IP-OUT1) at 471 in FIG. 4, host-A 110A identifies VM1 131 to be a member of IP-IN1 associated with IP-OUT1. As such, decapsulated multicast packet 630 is forwarded to VM1 131, but not to VM2 132. This is because Although VM2 132 is a member of IP-IN3 associated with IP-OUT1, VM2 132 has not joined IP-IN1. See blocks 385-395 in FIG. 3.

At host-D 110D, in response to receiving encapsulated multicast packet 620, host-D 110D examines encapsulated multicast packet 620 and performs decapsulation to generate decapsulated multicast packet 630 by removing outer header 622. Based on multicast mapping information (LP7, IP-7, IP-IN1, IP-OUT1) at 474 in FIG. 4, host-D 110D identifies VM7 137 to be a member of IP-IN1 associated with IP-OUT1. As such, decapsulated multicast packet 630 is forwarded to VM7 137. Decapsulated multicast packet 630 is the same as multicast packet 610 that originates from VM5 135.

In the the example in FIG. 6, host-B 110B does not receive encapsulated multicast packet 620 from host-C 110C. This is because neither switch S1 401 nor S2 402 has received any request to join IP-OUT1 from host-B 110B. This way, encapsulated multicast packet 620 may be sent in a multicast manner by leveraging the multicast forwarding mechanism of the multicast-enabled switches 401-402.

(b) Multicast Packets from VM6 136 to IP-IN2

In a second example in FIG. 7, consider the case where VM6 136 on host-C 110C sends egress multicast packet 710 to inner multicast group address=IP-IN2, of which VM3 133 on host-B 110B is a member. As shown in FIG. 7, egress multicast packet 710 includes inner header 712 and payload 714. Inner header 712 is addressed from source IP address=IP-6 associated with VM6 136 to inner multicast group address=IP-IN2. According to blocks 360 and 365 in FIG. 3, in response to detecting egress multicast packet 710 from VM6 136 via logical port LP6 166, host-C 110C determines IP-OUT2 associated with IP-IN2 based on multicast mapping information (IP-OUT2, IP-IN2) shown at 477 in FIG. 4.

Again, instead of sending the egress muticast packet to all known destination VTEPs according to the conventional approach, host-C 110C leverages the multicast-enabled network device(s) in physical network 105 to reach destination(s) associated with the outer multicast group address. At 370 in FIG. 3, host-C 110C generates encapsulated multicast packet 720 that includes outer header 722 (labelled "O") specifying (source VTEP IP address=IP-C, destination outer multicast group address=IP-OUT2, VNI=5000). Encapsulated multicast packet 720 is then sent to physical network 105 in a multicast manner.

At switch S2 402, encapsulated multicast packet 720 is received via port P5 connected with host-C 110C. Based on multicast mapping information (P4, IP-B, IP-OUT2) and (P6, IP-D, IP-OUT2) shown at 572, 574 in FIG. 5, switch S2 402 forwards encapsulated multicast packet 720 via ports P4 connected with switch S1 401 and P6 connected with host-D 110D. See blocks 375-380 in FIG. 3.

At switch S1 401, encapsulated multicast packet 720 is received via port P3. Based on multicast mapping information (P2, IP-B, IP-OUT2) and (P3, IP-D, IP-OUT2) at respective 562, 564 in FIG. 5, S1 401 determines that IP-OUT2 is associated with ports P1 and P3. Since encapsulated multicast packet 720 is received via P3, switch S1 401 forwards encapsulated multicast packet 720 to P2 connected with host-B 110B (i.e., omitting receiving port=P3 via which encapsulated multicast packet 720 is received). See blocks 375-380 in FIG. 3.

At host-B 110B, in response to receiving encapsulated multicast packet 720 from switch S1 401, host-B 110B examines encapsulated multicast packet 720 and performs decapsulation to generate decapsulated multicast packet 730 by removing outer header 722. Based on multicast mapping information (LP3, IP-3, IP-IN2, IP-OUT2) at 473 in FIG. 4, host-B 110B identifies VM3 133 to be a member of IP-IN2 associated with IP-OUT2 and forwards decapsulated multicast packet 730 to VM3 133. See blocks 385-395 in FIG. 3.

At host-D 110D, in response to receiving encapsulated multicast packet 720 from switch S2 402, host-D 110D examines encapsulated multicast packet 720. Based on multicast mapping information 476-477 in FIG. 4, host-D 110D determines that there is no local member of IP-IN2 associated with IP-OUT2. As such, encapsulated multicast packet 720 is dropped, and not forwarded to VM7 137 or VM8 138.

In the the example in FIG. 7, host-A 110A does not receive encapsulated multicast packet 720 from host-C 110C. This is because neither switch S1 401 nor S2 402 has received any request to join IP-OUT2 from host-A 110A. This way, encapsulated multicast packet 720 may be sent in a multicast manner by leveraging the multicast forwarding mechanism of the multicast-enabled switches 401-402.

Compared to the conventional approaches that send multicast traffic in a unicast manner, examples of the present disclosure provide a more efficient and scalable solution that reduces the likelihood of unnecessary multicast traffic flooding and network resource wastage. Further, examples of the present disclosure may be implemented without any modification at the multicast-enabled network device(s) in underlying physical network 105. Instead, their existing multicast capability is leverage to improve network performance when forwarding multicast traffic.

Leaving a Multicast Group Address

Figure 8:
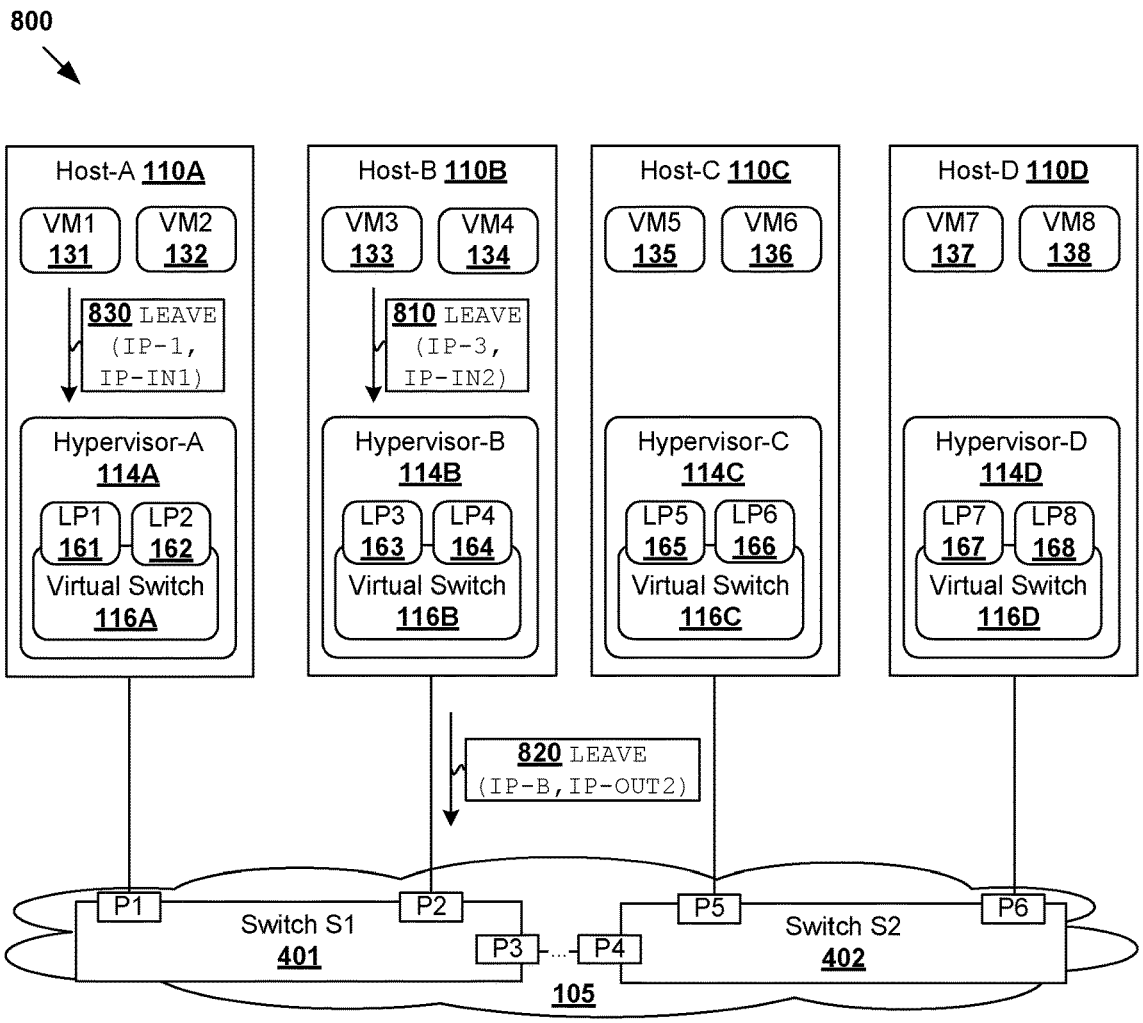
FIG. 8 is a schematic diagram illustrating an example of hosts handling requests to leave a multicast group address according to the example in FIG. 3.

FIG. 8 is a schematic diagram illustrating example 800 of hosts handling requests to leave an inner multicast group address in SDN environment 100. In a first example, consider the scenario where VM3 leaves IP-IN2 (see 810). Referring first to host-B 110B, in response to detecting leave request 820 via LP3 163, multicast mapping information (LP3, IP-3, IP-IN2, IP-OUT2) is removed; see 811 in FIG. 8. Since host-B 110B determines that it does not support any VM that has joined any inner multicast group address that is associated with IP-OUT2, host-B 110B generates and sends leave request 820 to leave IP-OUT2. In response to detecting leave request 820 via port P2, switch S1 401 removes multicast maping information (P2, IP-B, IP-OUT2); see 821 in FIG. 8. Switch S1 401 also forwards leave request 820 to switch S2 402, which then removes (P4, IP-B, IP-OUT2); see 822 in FIG. 8.

In a second example, consider the scenario where VM1 131 leaves IP-IN1 (see 830). In response to detecting leave request 830 via LP1 161, host-A 110A removes multicast mapping information (LP1, IP-1, IP-IN1, IP-OUT1); see 831 in FIG. 8. However, since IP-OUT1 is also assigned to IP-IN3 of which VM2 132 is still a member, host-A 110A does not generate and send any request to leave IP-OUT1. In other words, leave request 830 is suppressed. This way, host-A 110A may continue to act as a proxy for VM2 132 to receive multicast packets addressed to IP-OUT2 and IP-IN3.

Container Implementation

Although explained using VMs 131-138, it should be understood that SDN environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs 131-138. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs. Multicast mapping information discussed using FIG. 1 to FIG. 8 may also include container information, such as container MAC or IP address information, etc.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 8. For example, a computer system capable of acting as host 110A/110B/110C/110D may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a host to perform multicast packet handling in a software-defined networking (SDN) environment, wherein the method comprises:
   in response to detecting, from a virtualized computing instance supported by the host, a request to join a first inner multicast group address,
      obtaining an outer multicast group address that is assigned to the first inner multicast group address and one or more second inner multicast group addresses; and
   generating and sending a request to join the outer multicast group address to one or more multicast-enabled network devices that are capable of multicast forwarding based on the outer multicast group address; and
   in response to detecting, from the one or more multicast-enabled network devices and by the host, an ingress encapsulated multicast packet that includes an outer header addressed to the outer multicast group address and an inner header addressed to the first inner multicast group address,
      generating, by the host, a decapsulated multicast packet by removing the outer header from the ingress encapsulated multicast packet; and
      sending the decapsulated multicast packet to the virtualized computing instance that has joined the first inner multicast group address.

2. The method of claim 1, wherein obtaining the outer multicast group address comprises:
   sending a report to a management entity to cause the management entity to assign, from a pool of addresses, the outer multicast group address to the first inner multicast group address based on an assignment policy.

3. The method of claim 2, wherein obtaining the outer multicast group address comprises:
   generating the report to include the first inner multicast group address and virtual tunnel endpoint (VTEP) address information associated with the host.

4. The method of claim 2, wherein obtaining the outer multicast group address comprises:
   obtaining, from the management entity, mapping information that associates the outer multicast group address with the first inner multicast group address and the one or more second inner multicast group addresses.

5. The method of claim 1, wherein the method further comprises:
   detecting, from a second virtualized computing instance supported by the host, a request to join a particular second inner multicast group address to which the outer multicast group address is also assigned.

6. The method of claim 5, wherein the method further comprises:
   in response to detecting the ingress encapsulated multicast packet, not sending the decapsulated multicast packet to the second virtualized computing instance that has not joined the first inner multicast group address.

7. The method of claim 1, wherein the method further comprises:
   detecting, from the virtualized computing instance, a request to leave the first inner multicast group address; and
   in response to determination that the host does not support any virtualized computing instance that has joined at least one of the first inner multicast group address and the one or more second inner multicast group addresses, generating and sending a request to leave the outer multicast group address to the one or more multicast-enabled network devices.

8. A non-transitory computer-readable storage medium that includes a set of instructions which, in response to execution by a processor of a host, cause the processor to perform a method of multicast packet handling in a software-defined networking (SDN) environment, wherein the method comprises:
   in response to detecting, from a virtualized computing instance supported by the host, a request to join a first inner multicast group address, obtaining an outer multicast group address that is assigned to the first inner multicast group address and one or more second inner multicast group addresses; and generating and sending a request to join the outer multicast group address to one or more multicast-enabled network devices that are capable of multicast forwarding based on the outer multicast group address; and in response to detecting, from the one or more multicast-enabled network devices and by the host, an ingress encapsulated multicast packet that includes an outer header addressed to the outer multicast group address and an inner header addressed to the first inner multicast group address, generating, by the host, a decapsulated multicast packet by removing the outer header from the ingress encapsulated multicast packet; and sending the decapsulated multicast packet to the virtualized computing instance that has joined the first inner multicast group address.

9. The non-transitory computer-readable storage medium of claim 8, wherein obtaining the outer multicast group address comprises:

sending a report to a management entity to cause the management entity to assign, from a pool of addresses, the outer multicast group address to the first inner multicast group address based on an assignment policy.

10. The non-transitory computer-readable storage medium of claim 9, wherein obtaining the outer multicast group address comprises:

generating the report to include the first inner multicast group address and virtual tunnel endpoint (VTEP) address information associated with the host.

11. The non-transitory computer-readable storage medium of claim 9, wherein obtaining the outer multicast group address comprises:

obtaining, from the management entity, mapping information that associates the outer multicast group address with the first inner multicast group address and the one or more second inner multicast group addresses.

12. The non-transitory computer-readable storage medium of claim 8, wherein the method further comprises:

detecting, from a second virtualized computing instance supported by the host, a request to join a particular second inner multicast group address to which the outer multicast group address is also assigned.

13. The non-transitory computer-readable storage medium of claim 12, wherein the method further comprises:

in response to detecting the ingress encapsulated multicast packet, not sending the decapsulated multicast packet to the second virtualized computing instance that has not joined the first inner multicast group address.

14. The non-transitory computer-readable storage medium of claim 8, wherein the method further comprises:

detecting, from the virtualized computing instance, a request to leave the first inner multicast group address; and in response to determination that the host does not support any virtualized computing instance that has joined at least one of the first inner multicast group address and the one or more second inner multicast group addresses, generating and sending a request to leave the outer multicast group address to the one or more multicast-enabled network devices.

15. A host configured to perform multicast packet handling a software-defined networking (SDN) environment, wherein the host comprises:

a processor; and a non-transitory computer-readable medium having stored thereon instructions that, when executed by the processor, cause the processor to perform the following:

in response to detecting, from a virtualized computing instance supported by the host, a request to join a first inner multicast group address, obtain an outer multicast group address that is assigned to the first inner multicast group address and one or more second inner multicast group addresses; and generate and send a request to join the outer multicast group address to one or more multicast-enabled network devices that are capable of multicast forwarding based on the outer multicast group address; and in response to detecting, from the one or more multicast-enabled network devices and by the host, an ingress encapsulated multicast packet that includes an outer header addressed to the outer multicast group address and an inner header addressed to the first inner multicast group address, generate, by the host, a decapsulated multicast packet by removing the outer header from the ingress encapsulated multicast packet; and send the decapsulated multicast packet to the virtualized computing instance that has joined the first inner multicast group address.

16. The host of claim 15, wherein the instructions for obtaining the outer multicast group address cause the processor to:

send a report to a management entity to cause the management entity to assign, from a pool of addresses, the outer multicast group address to the first inner multicast group address based on an assignment policy.

17. The host of claim 16, wherein the instructions for obtaining the outer multicast group address cause the processor to:

generate the report to include the first inner multicast group address and virtual tunnel endpoint (VTEP) address information associated with the host.

18. The host of claim 16, wherein the instructions for obtaining the outer multicast group address cause the processor to:

obtain, from the management entity, mapping information that associates the outer multicast group address with the first inner multicast group address and the one or more second inner multicast group addresses.

19. The host of claim 15, wherein the instructions further cause the processor to:

detect, from a second virtualized computing instance supported by the host, a request to join a particular second inner multicast group address to which the outer multicast group address is also assigned.

20. The host of claim 19, wherein the instructions further cause the processor to:

in response to detecting the ingress encapsulated multicast packet, not send the decapsulated multicast packet to the second virtualized computing instance that has not joined the first inner multicast group address.

21. The host of claim 15, wherein the instructions further cause the processor to:

detect, from the virtualized computing instance, a request to leave the first inner multicast group address; and in response to determination that the host does not support any virtualized computing instance that has joined at least one of the first inner multicast group address and the one or more second inner multicast group addresses, generate and send a request to leave the outer multicast group address to the one or more multicast-enabled network devices.

* * * * *